Figure 8:
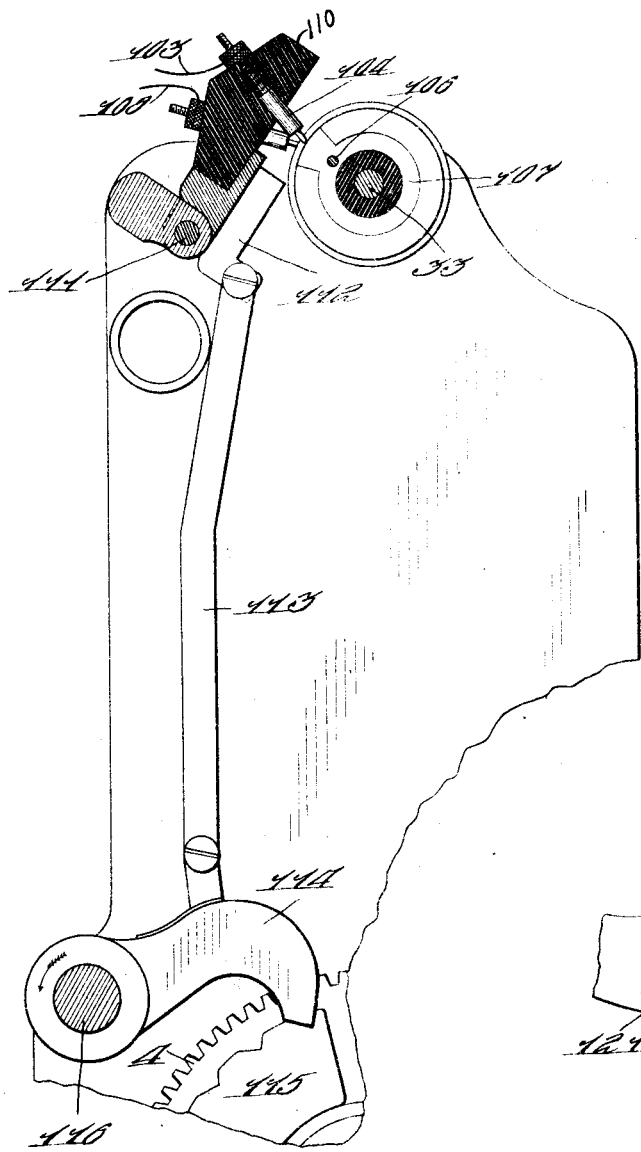

W. F. SCHWEIGER.
CASH REGISTER.
APPLICATION FILED APR. 25, 1904.
1,033,478.
Patented July 23, 1912.
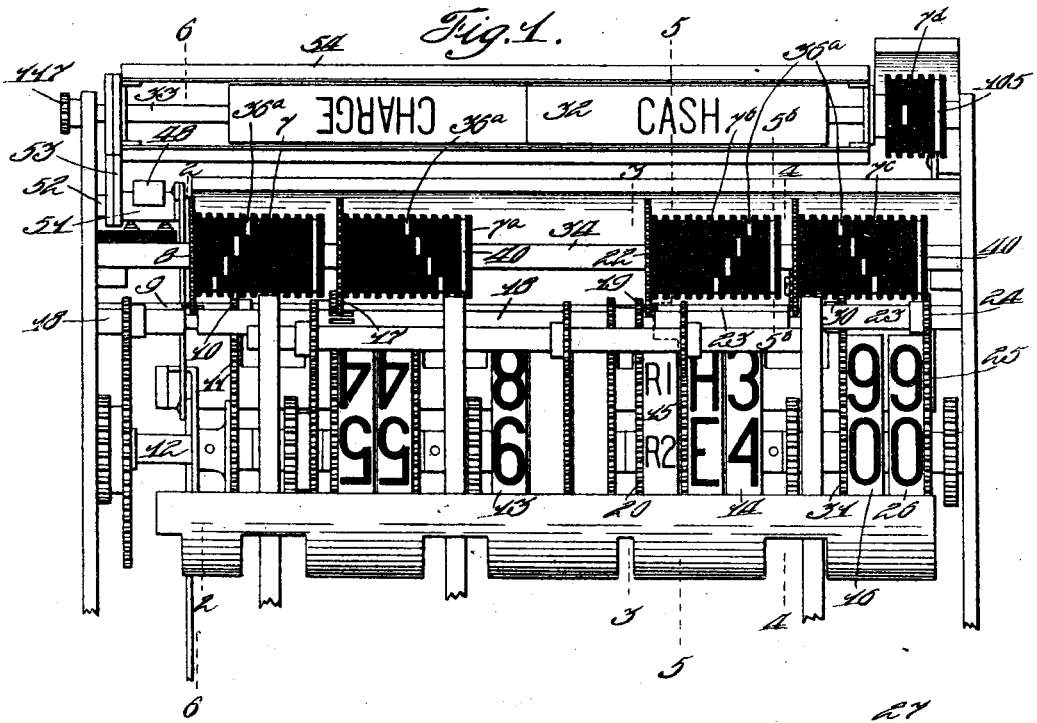
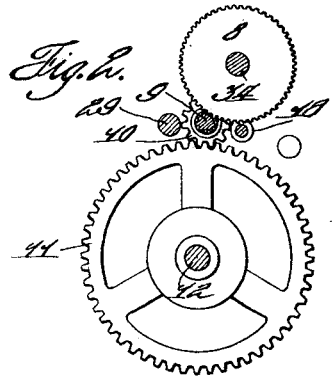
Witnesses
WM. McCarthy
Wm. O. Henderson
Inventor
William F. Schweiger
Frank Park Davis
J. B. Hayward
Attorneys

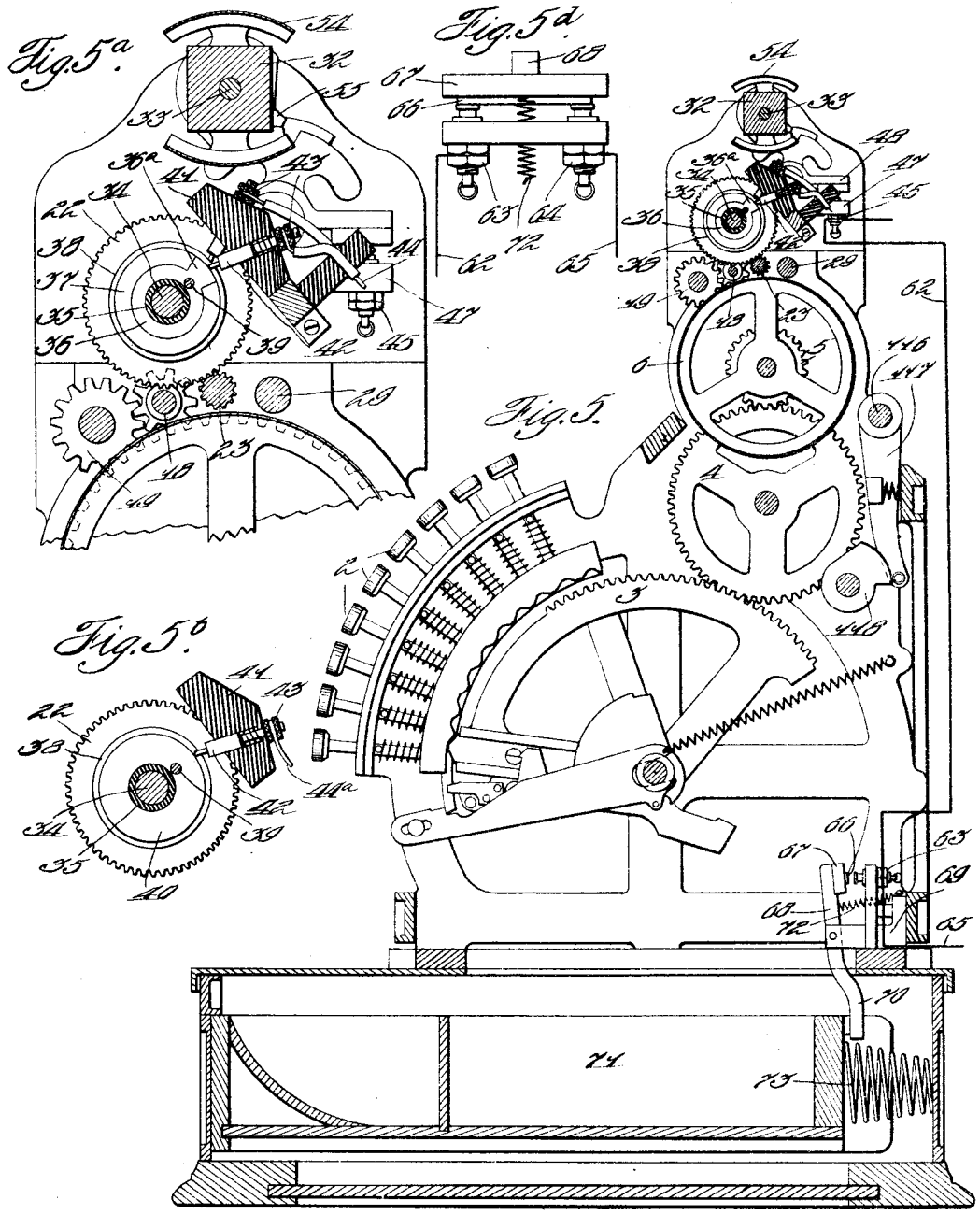

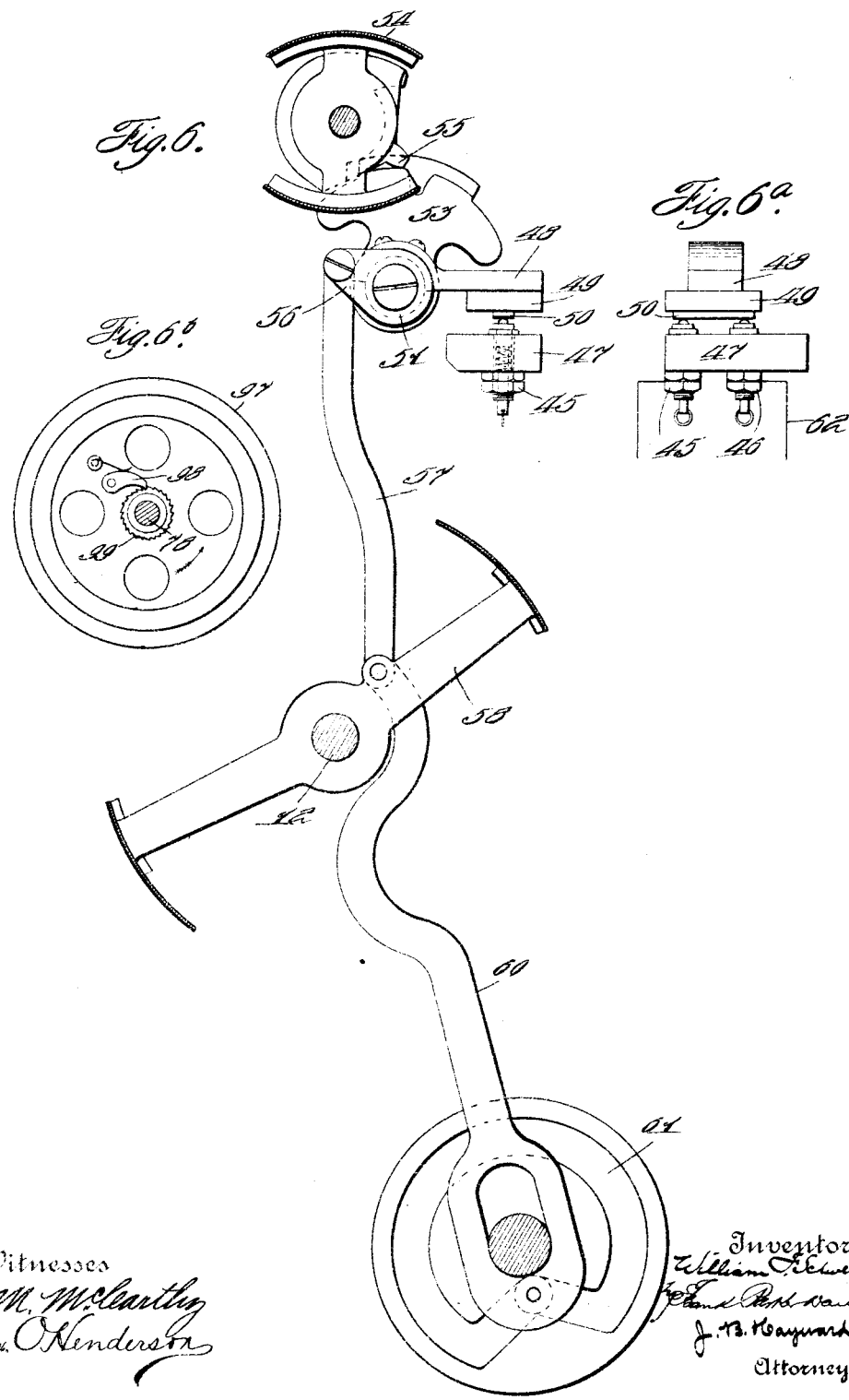

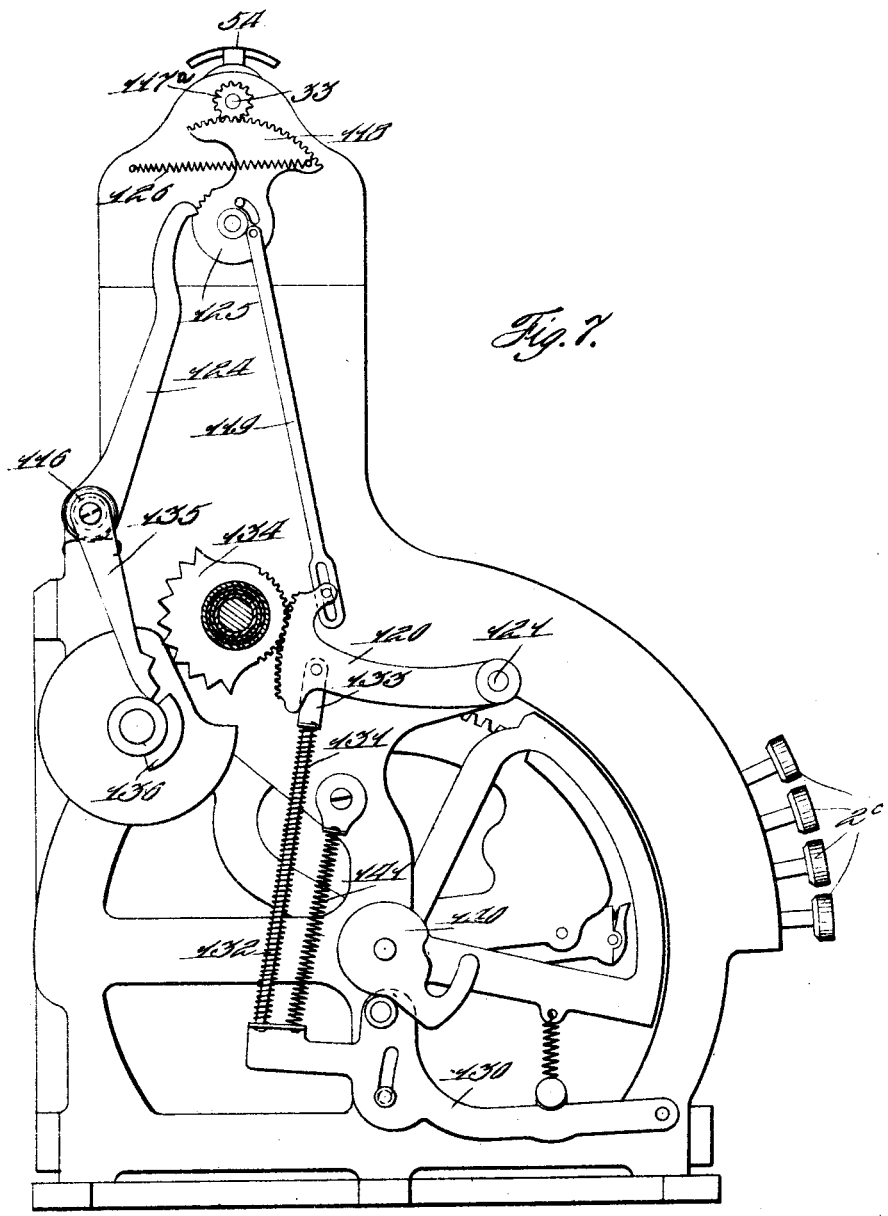

W. F. SCHWEIGER.
CASH REGISTER.
APPLICATION FILED APR. 25, 1904.

1,033,478.

Patented July 23, 1912.
9 SHEETS—SHEET 5.

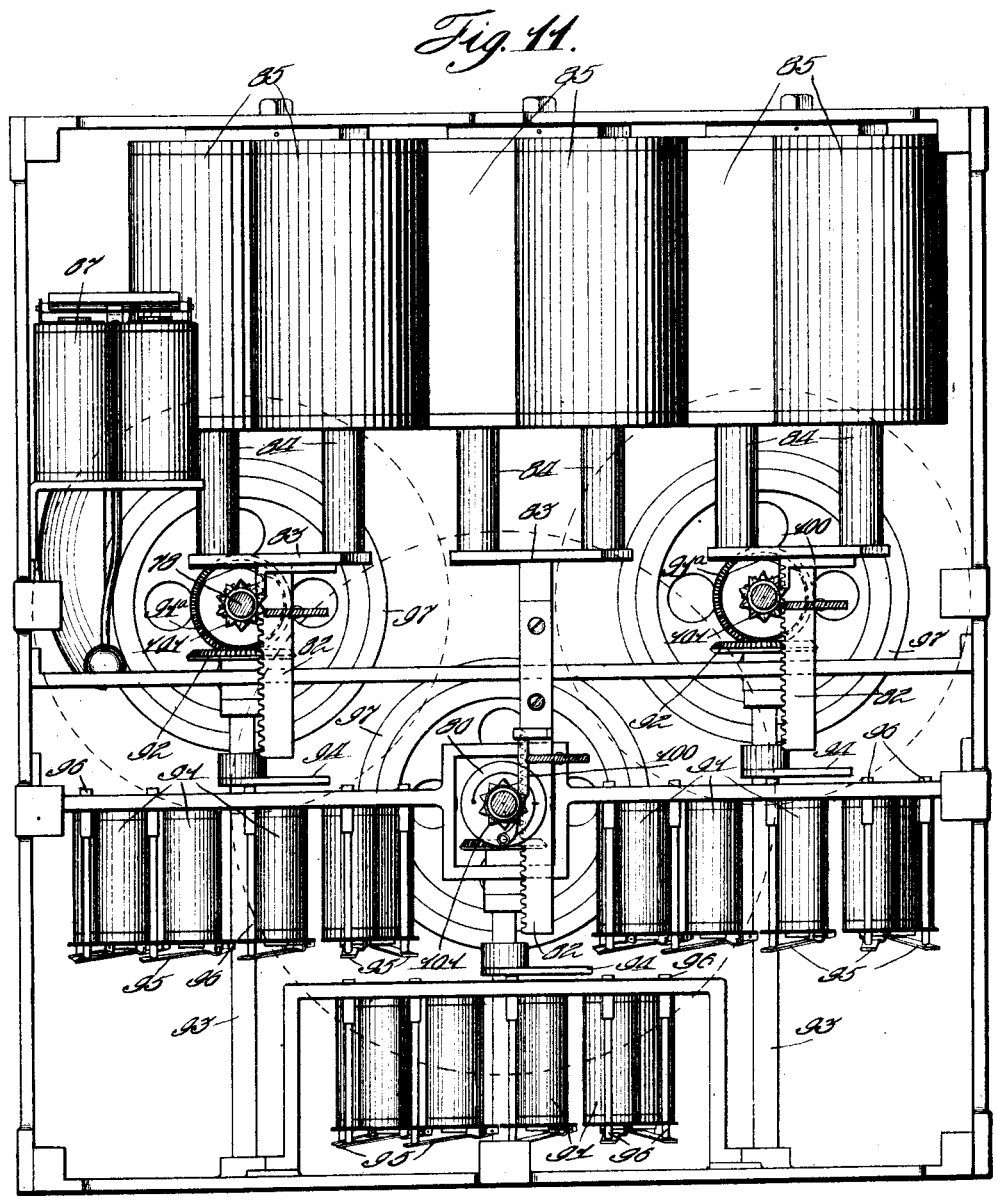

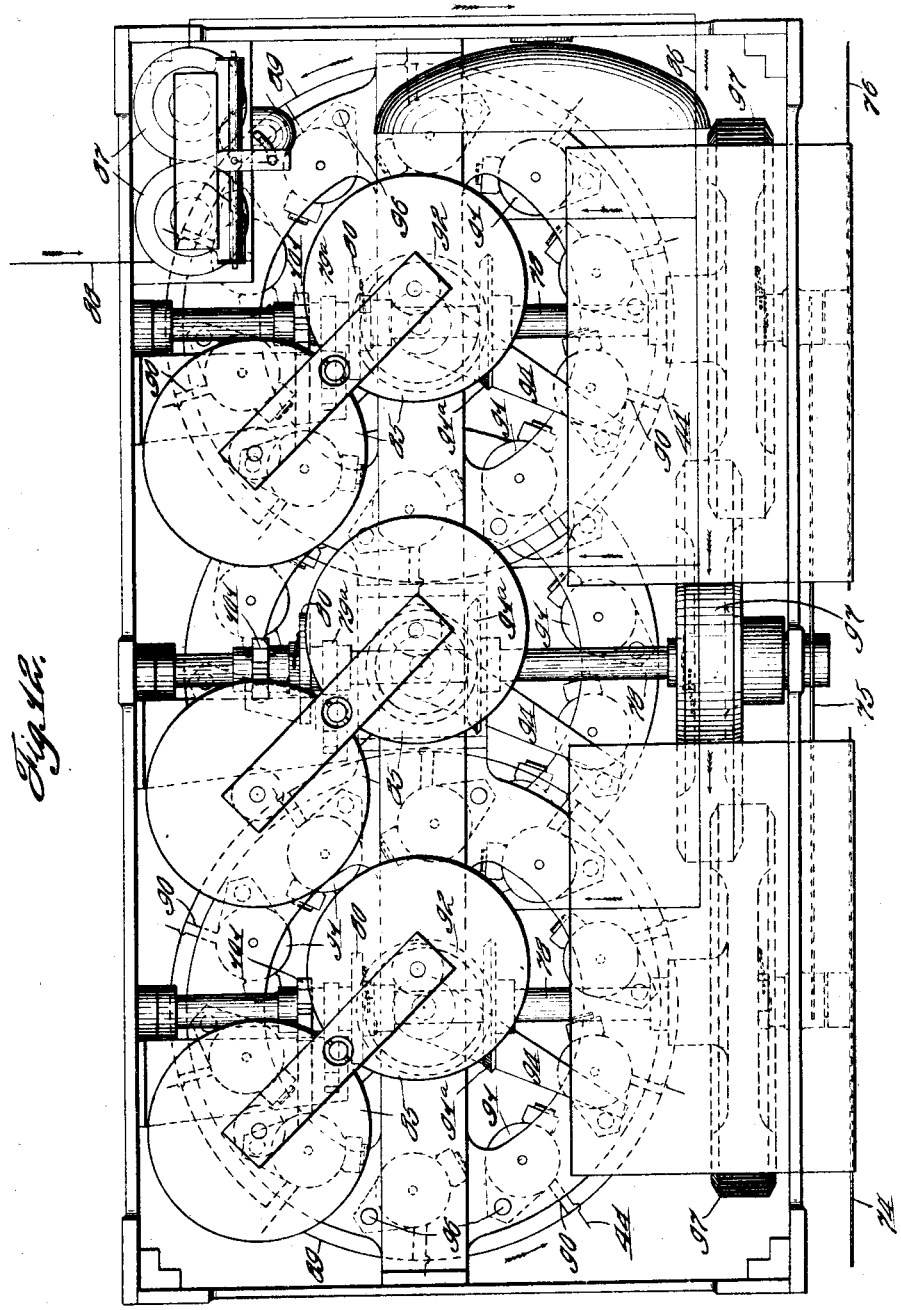

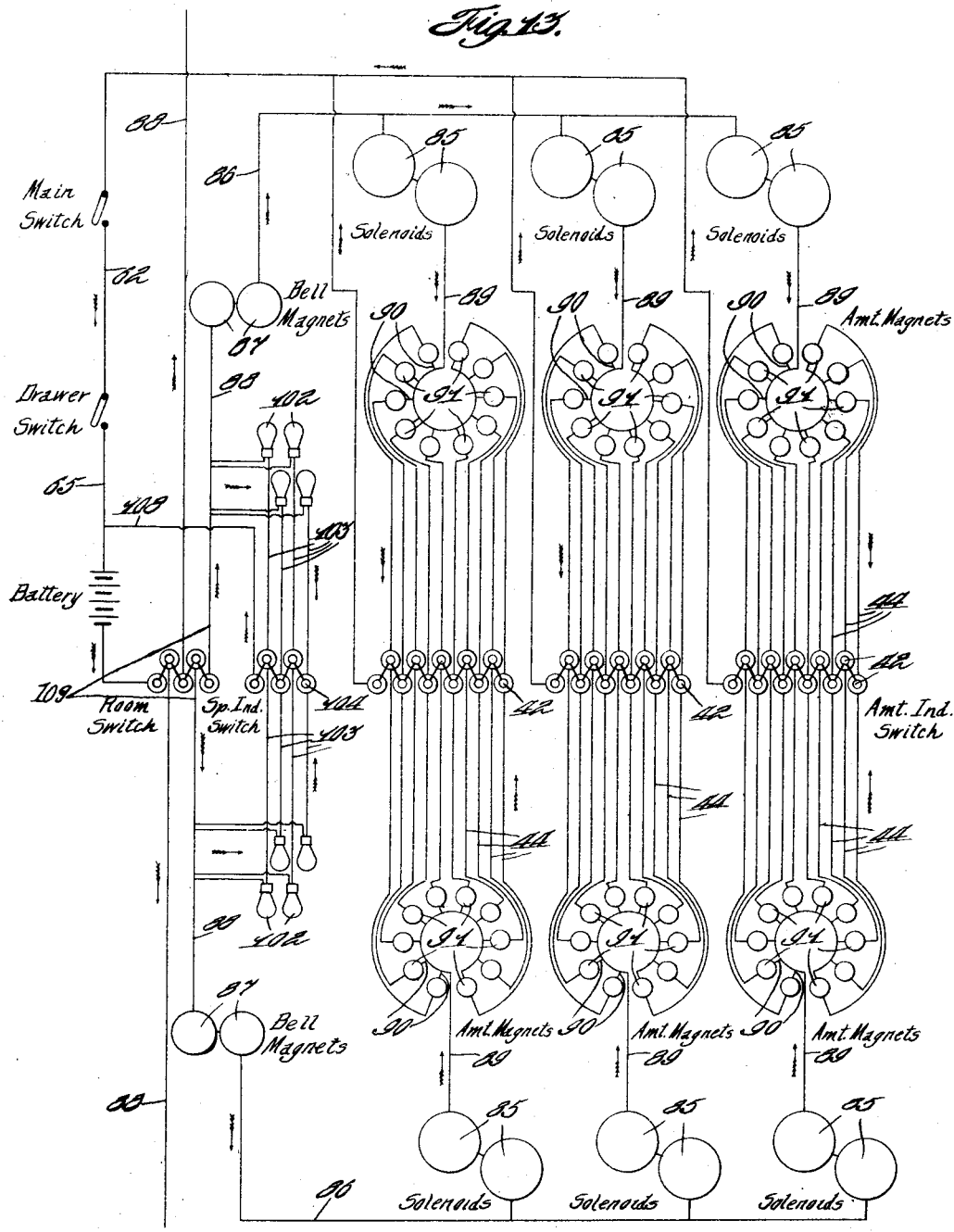

UNITED STATES PATENT OFFICE.

WILLIAM F. SCHWEIGER, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,033,478.  Specification of Letters Patent.  Patented July 23, 1912.

Application filed April 25, 1904. Serial No. 204,823.

*To all whom it may concern:*

Be it known that I, WILLIAM F. SCHWEIGER, a citizen of the United States, residing at Dayton, in the county of Montgomery and State of Ohio, have invented certain new and useful Improvements in Cash-Registers, of which I declare the following to be a full, clear, and exact description.

The principal object of the invention is to show at a distance the indications which represent transactions registered or recorded in a machine and the invention relates more especially to that type of cash register wherein there is a preliminary manipulation to prepare the mechanism for registering or recording a specified amount together with the character of the transaction, and a further and final operation which effects the registering or recording and also the display or indication. Such a machine contains a differential element for each bank or set of keys or each manipulative setting element as the case may be, and of course the indication as well as the registration and recording is regulated by the adjustments of the said differential element. It is proposed by the present invention to adopt a form of indicating means which can be controlled at a distance by the adjustments of such differential elements in the machine proper, whereby after the preliminary manipulation of the machine, the final operation of the same will result in a display of the proper indication at any desired distance from the machine.

In a co-pending application No. 194,384, filed Feb. 19, 1904, a distant indication construction is described and claimed as applied to a different type of cash register, namely: one wherein the single performance of depressing certain selected keys constitutes an operation of the machine, and the elevation of certain tablets by such depression of keys controls the distant indication. Although there is in this type of machine a differential registering element, it does not figure in the control of the distant indication connections. In many particulars, however, the present construction is similar to that shown in said co-pending application and it is to be understood at the outset that it is not proposed to lay claim in the present case to subject matter common to the two applications but that any broad claims pertaining to such subject matter will be included in the earlier filed application.

The preferred agency for effecting distant indication in the carrying out of the present invention is that of electricity and a multiplicity of circuit connections are arranged to provide for the different indications within the compass of the cash register and these different circuit connections have suitable contact terminals grouped according to the denominational and special transaction grouping of the manipulative setting devices of the cash register; also to select the distant place where the indication is to show in case there are a number of places where indication structures are located all controlled from the same machine. A variable contact device common to the contact terminals of one group is controlled by the differential element whose adjustment depends upon the manipulation of the setting means of the corresponding group or bank in the cash register. Switch or cut out mechanism is provided to disable the distant indicator during the adjustment of the differential elements in the cash register so that not until the new contact connections have been established to correspond with the preliminary manipulations of the setting devices will there be any display of a distant indication, the arrangement being such that just at the conclusion of a complete operation of the machine the switching or cut out mechanism will be restored to circuit closing adjustment.

The present invention not only provides for displaying at a distance the amount of a purchase but also the character of the transaction. However the same form of indication is not employed for the latter as for the former as the invention is illustrated in the present instance. For the amount indication movable display devices are used with electric motors to actuate the same, whereas the character of a transaction is indicated by illumination.

With the above stated and other objects in view, the invention consists in certain novel features of construction and combinations of parts, the essential elements of which are set forth in appended claims and a preferred form of embodiment of which is hereinafter specifically described with reference to the drawings which accompany and form part of this specification.

Figure 9:
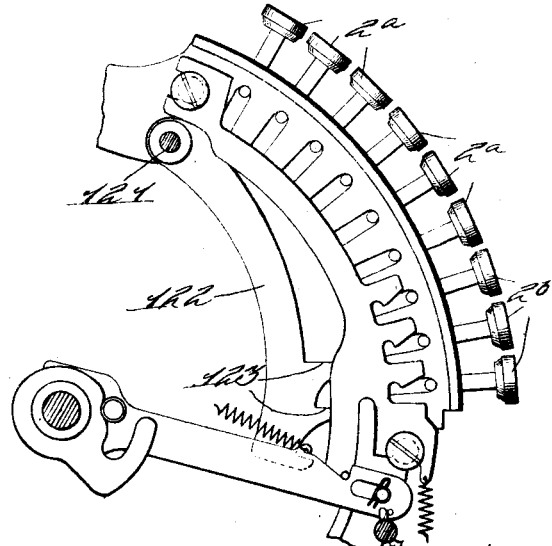
Figure 10:
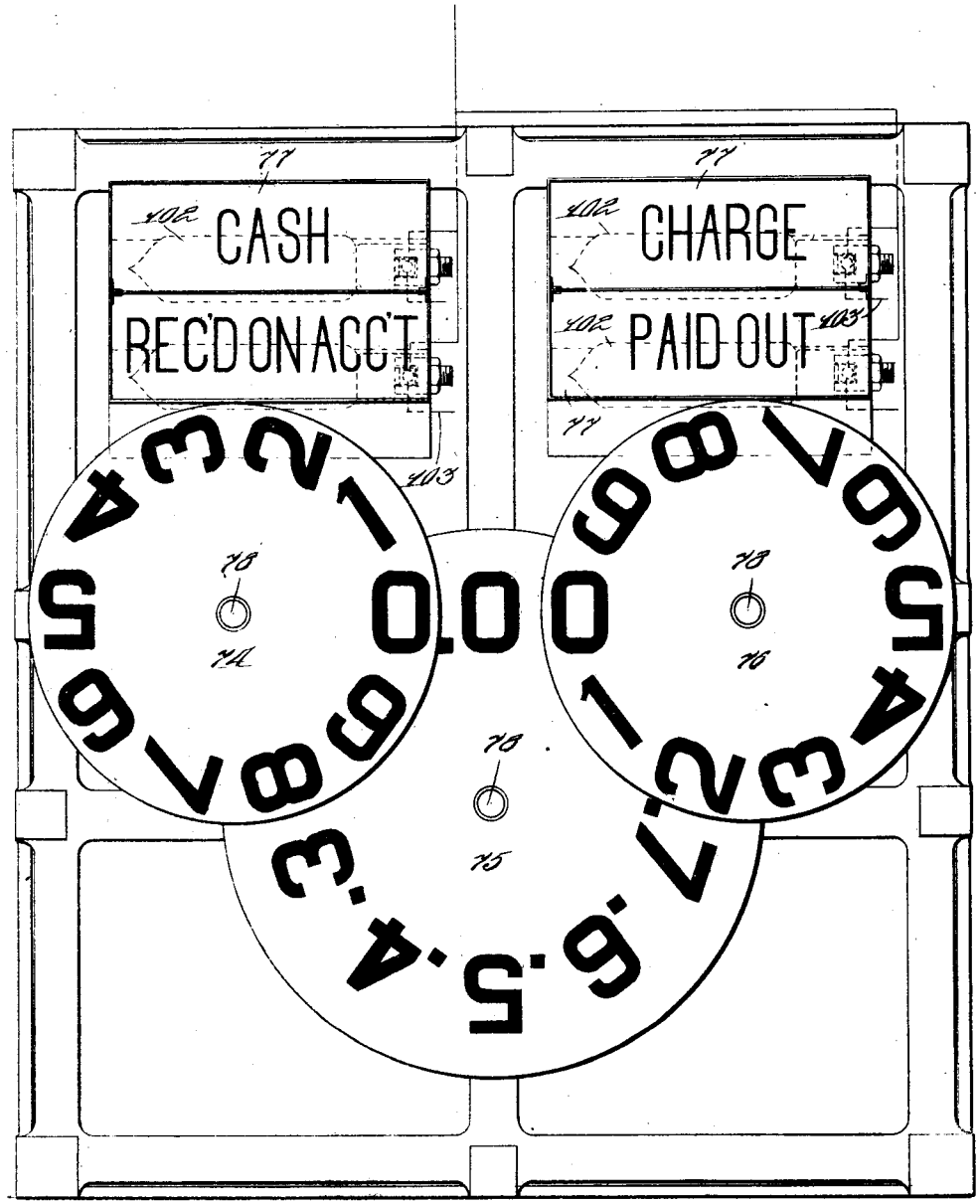

Of said drawings: Figure 1 represents in front elevation the top part of a cash register of the type hereinbefore designated, including the regular indicators of such machine and illustrating in connection therewith the variable contact devices for controlling the distant indication. Figs. 2, 3 and 4 represent respectively cross sections taken on lines 2—2, 3—3 and 4—4 of said Fig. 1, these views being for the purpose of illustrating in what manner certain of said variable contact devices are geared to the corresponding regular indicators. Fig. 5 represents the complete cash register in vertical section taken from front to rear, the section on which the upper part is taken being indicated by the line 5—5 in Fig. 1. Fig. 5ª represents the upper part of Fig. 5 on an enlarged scale. Fig. 5ᵇ is a cross section of one of the variable contact devices taken on line 5ᵇ—5ᵇ of Fig. 1. Fig. 5ᶜ represents one of the variable contact devices in longitudinal section. Fig. 5ᵈ is a detail of the drawer switch. Fig. 6 represents partly in section and partly in elevation, the means for operating the main switch or cut out device; see lines 6—6 in Fig. 1. Fig. 6ª is a detail of the main switch. Fig. 6ᵇ is a detail of an inertia device. Fig. 7 shows an end elevation of the cash register with its printer omitted and the nested sleeves for typecarriers in cross section. Fig. 8 is a cross section on an enlarged scale showing the special indicator contacts and switching devices. Fig. 9 shows a side elevation of the divided bank of keys including clerks' and special transaction keys, this view showing the differential element which is controlled by said latter keys. Fig. 10 represents the distant indication structure in front elevation without its casing. Fig. 11 represents the same in rear elevation. Fig. 11ª is a detail sectional view of a one-way driving connection appearing on a smaller scale in Fig. 11. Fig. 12 is a top plan view of said distant indication structure; and Fig. 13 is a diagram of circuits.

The particular type of cash register to which the invention is shown and applied in the present case is well known in the art and appears in a large number of prior patents, see for example: patent to Cleal and Reinhard No. 580,378, dated April 13, 1897; and hence it will not be necessary to go into a detailed description of the construction and operation of the register proper. Suffice it to say that each bank of amount keys 2 (see Fig. 5) controls the extent of movement of an oscillating segment 3 connected through an intermediate gear wheel 4 with the pinion 5 of an indicating disk 6. These connections are of course duplicated for each bank of amount keys and the machine shown in the drawings has also a bank of clerks' keys being the upper six keys 2ª of a divided bank shown in Fig. 9; and a bank of room keys 2ᶜ (see Fig. 7) so that there will be five of the indicating disks 6 (see Fig. 1) from which to read an indication at the front of the machine. These disks or rollers are duplicated with the numerals and letters reversed so as to provide for a similar indication at the back of the machine. This is well known in the art as "back and front indication" and the construction whereby a proper reading from left to right is secured at the back as well as at the front of the machine need not be described in detail. The before mentioned patent to Cleal and Reinhard shows how this is accomplished by a set of counter shafts with pinions in engagement with gears on the indicating disks or rollers, substantially as shown in the present case.

The variable contact devices for controlling selection of the distant indication structure to be operated, and indication of amounts therein are located above the line of regular indicators and are geared respectively thereto. These variable contact devices are designated in Fig. 1 by numerals 7, 7ª, 7ᵇ and 7ᶜ and each is made up of a body of insulating material cylindrical in form and peripherally grooved, together with disks of conducting material embedded in the insulation, all but one of which disks have each a circumferentially limited exposed portion. These exposed portions constitute contact surfaces which range spirally around the cylindrical body so that in different adjustments of the latter different ones of said exposed portions will contact with a corresponding terminal of a row arranged in rear of the cylindrical body. It will thus be seen that a different circuit connection can be made for each different adjustment of the cylindrical body and hence with the latter geared to one of the regular indicators a circuit connection can be established for producing a corresponding indication at a distance to any which said regular indicator shows.

The variable contact device designated by the numeral 7 is for coöperation with the regular indicators which show units-of-dollars and a gear wheel 8 compounded with the body portion of said variable contact device, meshes with gear teeth cut in the counter shaft 9 (Fig. 2) which carries a pinion 10 meshing with a gear wheel 11 secured to a shaft 12 to which the regular units-of-dollars indicating rollers 13 and 14 are secured. The next adjacent variable contact device 7ª happens to be combined with the special indicator 15 of the cash register, which indicator in the present instance displays room designations and may not therefore require as many of the spirally arranged contact surfaces in the body of the variable contact device as those variable contact devices which control amount indications; in fact the machine shown in the drawings is intended for use in connection with but four different rooms where goods purchased may be served and this calls for but four keys 2ᶜ (Fig. 7) and but four of the spirally arranged contact surfaces whereas in each of the other three variable switch devices shown there are ten of these contact surfaces to correspond with numerals 0–9 inclusive. The said variable switch device 7ᵃ has compounded with it a gear wheel 17 engaging teeth cut in another of the counter shafts 18 which carries a pinion 19 in mesh with a gear 20 of the special indicator roller 15. The variable contact device 7ᵇ coöperates with the regular indicators for units-of-cents and has compounded with it a gear 22 which engages teeth cut in a counter shaft 23 (Fig. 3) carrying a pinion 24 in mesh with the gear 25 secured to the units-of-cents front disk or roller 26. The variable contact device 7ᶜ coöperates with the tens-of-cents indicating disks or rollers and its gear 27 meshes with a pinion 28 which in turn engages teeth cut in a counter shaft 29 (see Fig. 4) which counter shaft carries a pinion 30 in mesh with a gear wheel 31 on the tens-of-cents front indication roller 16.

The clerks' indication rollers are not in the present instance combined with a distant indication equipment but there is a distant indication equipment for the top special transaction indicator 32, the same having mounted upon its rotating shaft 33 a variable contact device 7ᵈ similar in construction to these heretofore mentioned and having four of the spirally arranged contact surfaces.

Referring now to Figs. 5, 5ᵃ, 5ᵇ and 5ᶜ for details of construction of the variable switch devices, reference numeral 34 designates a journal common to all of the variable contact devices and extending from side to side of the machine; 35 a sleeve of insulating material which prevents electrical connection between this shaft and any parts of the variable contact devices; 36 one of the metal disks which provide the spirally arranged contact surfaces of variable contact device 7ᵇ, this disk having a segmental arm 36ᵃ whose circumferential edge forms such surface; 37 a fiber ring which surrounds the central portion of the metal disk 36 and comes up against the sides of the segmental projection 36ᵃ, this ring being of the same thickness as the metal disk; and 38 a fiber disk of circular contour which fits the sleeve 35 and thus extends over the sides of both the fiber ring 37 and the metal disk 36; this disk 38 being of greater diameter than the ring 37. It will be seen that these disks and rings assembled side by side upon the sleeve 35 will result in the construction of a cylindrical body portion of the character heretofore described. All of the metal disks 36 are in electrical connection through the medium of a metal rod 39 (Fig. 5ᶜ) and this rod also connects electrically with a metal annulus 40 at the right-hand end of the cylindrical body providing a continuous metal contact surface as the base of a groove formed by two of the fiber disks 38.

In an insulating cross bar 41 extending transversely between the sides of the machine frame there are mounted spring-pressed contact points 42 for all the variable contact devices, these points occupying the annular grooves thereof and being in electrical engagement with binding posts 43. Wires connected with the binding posts of those contact points which are arranged for engagement with the spiral series of contact surfaces of the variable contact device 7ᵃ constitute lead wires to the different rooms. The wire connected with the contact point which engages the continuous metal disk of this variable contact device 7ᵃ runs to one pole of the battery.

Referring now to the wires which connect with the contact points arranged to engage the spiral series of contact surfaces of any one of the other variable contact devices, ten of these wires 44 extend separately to electromagnets hereinafter described which form part of the distant indication structure and operate to determine the indication; the eleventh wire 44ᵃ which connects with the contact point engaging the continuous contact surface extends to one terminal of a pair 45—46, (Fig. 6ᵃ) which are supported in a fiber block 47 on the frame of the cash register. Above this pair of contacts a main switch is arranged, the same comprising an arm 48 (Fig. 6) carrying a fiber cross piece 49 with a contact strip 50 for engagement with the contacts 45—46 when the arm 48 is lowered. The arm 48 is secured to a sleeve 51 journaled upon a stub shaft 52 projecting from one side of the main frame (Fig. 1) and this sleeve carries a segment 53 for operating the top indicator flash 54 whose journal is provided with the usual single tooth disk 55 for engagement with the notch of said segment 53. Sleeve 51 carries a crank arm 56 which is coupled by link 57 with the main flash 58 which is operated in the usual manner by roller equipped link 60 and a box cam 61, and in turn operates the top flash. It will be understood that in this type of cash register the flashes are moved to concealing position at the commencement of the turning of the crank handle. It is for this reason that the main switch above described is connected with the flash mechanism as it is necessary to prevent the completion of any circuit connections while the regular indicators are moving to new positions.

It will be seen that the construction just described provides for the opening of the main switch at the outset of the operation of the machine by the turning of the crank handle. Of course it will be further understood that in the operation of a machine of the type specified the flashes are moved back to exposing position at the conclusion of an operation. Hence the main switch is closed as the crank handle comes home and by this closing of the main switch the distant indication is displayed.

Inasmuch as the distant indication structure shown and presently to be described, provides for the indicators being moved to indicating position as distinguished from illumination types, it is not essential that a current of electricity be present to maintain this indication and hence provision is made for breaking the circuit and discontinuing the current when the indication has been effected at a distance. The present construction provides for this being done by the operation of the drawer of the cash register and by reference to Fig. 5 it will be seen that a wire 62 which couples with the terminal 46 of the main switch does not extend directly to the battery but goes first to one of a pair of spring-pressed terminals 63, 64, (Fig. 5ᵈ) the other terminal of the pair being connected by a wire 65 with one pole of the battery. These two contacts 63, 64 are confronted by a metal strip 66 carried on a fiber head 67 of a lever 68 which is pivoted to an arm 69 projecting forward from the main frame, this lever having a lower arm 70 which extends behind the cash drawer 71. A spring 72 tends to draw the upper arm of the lever rearwardly and thereby close the switch but so long as the drawer is closed the lower arm 70 of the lever is restrained by its abutment against the back of the drawer. When the drawer is released toward the conclusion of an operation of the machine and thrown open by its spring 73, this switch 68 is thereupon closed so that the circuit connections can be completed for making the distant indication. However, this distant indication having been made, the closing of the drawer will open the switch and thus break the circuit through which the current has operated to make the distant indication.

Passing now to the distant indication construction, the same comprises a supporting frame work and three indicating disks 74, 75, 76 for dollars, dimes and cents respectively; also light boxes 77 bearing inscriptions on their translucent fronts to indicate special transactions. The arrangement for illuminating these boxes will however be described later.

Referring to the indicating disks, each one of the same is secured upon a horizontal shaft or spindle 78 carrying a ratchet 79 (see Fig. 11ᵃ). As the devices for setting each indicating disk are the same those pertaining to one only of said disks will be described in detail.

Loosely mounted upon the spindle 78 is a gear wheel 79ᵃ which has compounded with it a disk 80 carrying a spring-pressed pawl 81 in engagement with the ratchet 79, said gear wheel or pinion being engaged by a rack 82. This rack depends from a cross bar 83 uniting the cores 84 of a double solenoid magnet 85 supported in inverted position in the frame work. One end of the winding of this solenoid magnet is connected by a wire 86 (Fig. 12) with one end of the winding of a magnet 87 of a magneto bell, the other end of said magneto bell magnet being connected by a wire 88 to the appropriate contact point of the room selecting variable switch device of the cash register. The other end of the winding of the solenoid magnet has connected with it a wire 89 from which branches 90 extend to a circular series of magnets 91 to which are connected respectively the herein 'fore mentioned wires 44 of the contact points of one of the amount determining variable switch devices, it being of course understood that each end of the branch wires 90 unites with one end of the winding of one of the magnets 91 and the switch wire unites with the opposite end of such winding.

It will now be seen that the closing of circuit connections in the cash register will cause a current to traverse each of the solenoid magnets and one of the single bobbin magnets 91 in each of the circular series according to which particular contact points 42 are in engagement with their corresponding contact surfaces in the variable contact devices which determine the amount to be indicated. It will also be seen that the energizing of a solenoid magnet 85 will cause the rack 82 connected with its cores to be drawn upwardly and the indicator disk to be turned through the ratchet and pawl connections heretofore described.

The spindle 78 carries a beveled gear 91ᵃ in mesh with a similar gear 92 on an upright shaft or spindle 93 which carries a horizontally extending arm 94 designed to sweep over the circle of the magnets 91. Each one of the latter has an armature in the form of a hinged plate 95 upon which rests a pin 96 slidingly engaged with the frames which support the single bobbin magnets. When any one of the latter is excited the attraction of its armature 95 causes the pin 96 to be thrust upwardly into the path of the arm 94. Hence the latter will be checked by the stop pin of the magnet which corresponds with the numeral displayed in the cash register and of course the numeral on the dial of the distant indication structure is correspondingly positioned. In order to prevent too sudden an operation which might be injurious to the structure by reason of excessive impact of the arm 94 against the stop pin, there is mounted loosely upon the shaft or spindle 78 a weighted fly wheel 97 (Fig. 12) the same carrying a pawl 98 which engages a ratchet 99 on the spindle (Fig. 6$^b$). The inertia of this fly wheel must be overcome by the electric current in order to turn the spindle. It will be understood of course that one of the single bobbin magnets stops the arm 94 at a zero position and that when no key of the bank is operated the zero position taken up by the indicator in the cash register causes a position of the corresponding variable contact device to be assumed which leaves that one of the contact fingers or points 42 in contact with its metal disk 36, which finger or point is connected with the said zero magnet.

It will be understood from what has heretofore been stated with reference to the drawer operated switch that upon the completion of an operation of the machine and a closing of the drawer, the circuit connections are broken. Hence the solenoids are deënergized and their cores drop and the gear wheels 79$^a$ are run backward, the pawls 81 clicking over the ratchets 79. In order to prevent any tampering with the indicator disks of the distant indication structure or accidental displacement thereof, each cross plate 83 is provided with a depending projection 100 which when the solenoid is deënergized and its cores drop engages a star wheel 101 secured to the spindle 78.

It will not be necessary to describe the megneto bell in detail as it is of the well known form and is provided for the purpose of attracting attention to the making of the indication, it of course being understood that the maintenance of the current is of limited duration and the bell consequently rung a comparatively short time.

It has been mentioned hereinbefore that the character of the transaction is indicated at a distance by illumination. Hence it will be understood that the circuit connections for this part of the distant indication structure must be varied somewhat so as to secure a maintenance of current between transactions. At the same time the circuit connection should be interrupted while the cash register is being operated. Incandescent lamps 102 (Fig. 10) are placed in the light boxes 77 and one side of each lamp is connected by a wire 103 with contact points 104 respectively (Fig. 8) which are similar to the contact points 42 but coöperate with the variable contact device 7$^d$ shown in front elevation in Fig. 1. This device is made up in just the same way as before described with reference to the other variable contact devices and as hereinbefore stated is secured upon the shaft 33 of the special indicator. The circular disk 105 of this variable contact device 7$^d$ which circular disk provides a continuous contact surface, is in electric connections through a rod 106 with the four disks 107 and is connected by a wire 108 with one pole of the battery. (See diagram Fig. 13). The other sides of the four incandescent lamps are connected by a common wire 109 with the other pole of the battery through the selective room switch connections. These connections are made exclusive of the drawer and flash switches of the cash register so as not to be affected thereby. Hence it becomes necessary to provide other means for interrupting this lamp circuit during the operation of the machine. This is accomplished by mounting the contact points 104 in a bar of insulation 110 which is pivotally supported at 111 in the framework of the machine. In order to secure movement of this bar 110 at the proper times for it to constitute a switch and prevent the completion of the lamp circuit connections during the operation of the machine, such hinged bar is coupled to certain alining devices which are well known and operate at the outset of the turning of the crank to release previously set parts of the register and are again made effective at the end of the operation of the machine to aline newly set parts. To this end a lug 112 on the switch piece 110 is connected by a link 113 with an ear on an alining arm 114 being one of a series of such arms for engaging notches in plates 115 fastened to the intermediate gears 4 of the indicator mechanism in the cash register. These arms 114 are secured on the shaft 116 which as shown in Fig. 5 has an arm 117 spring-pressed forwardly and equipped with a roller bearing against a cam 118 on a revolution shaft of the machine. Upon the turning of the crank of the machine the shoulder of this cam is carried past the roller and thereupon the arm 117 springs forward and the arms 114 are lifted out of the notches of the plates 115 and through the link 113 the bar 110 is thrown back and the contact point 104 removed from engagement with its plate 107 and the corresponding lamp thereby extinguished. As the crank is brought home the cam 118 forces back the arm 117 and the arms 114 are moved downwardly and consequently the bar 110 brought forward so as again to engage its contact points 104 with the bases of the grooves in the variable contact cylinder 7$^d$. This will cause an electrical contact to take place between one or another of these contact points and its corresponding plate 107 which has been positioned according to the character of the transaction. When no key is pressed in the cash lamp will be illuminated.

The adjustments of the special transaction indicator in the cash register are accomplished in a well known way. The shaft of said indicator 33 carries a pinion 117ᵃ (Fig. 7) which is in mesh with a segment 118 coupled by a link 119 with another segment 120 secured to a shaft 121 which carries a pendant arm 122 (Fig. 9) having a series of graduated projections 123 for contact with one or another of the shanks of the special keys 2ᵇ, whichever one is depressed. In this way the extent of movement of the segment 120 is varied and consequently the positioning of the special indicator is determined. On the same shaft 116 which carries the arms 114 there is an upwardly extending arm 124 which engages one of four notches in the hub 125 of the segment 118 to hold the latter at a set position. A spiral spring 126 tends to draw the segment 118 rearwardly. The segment 120 is connected with link 119 by a slot and pin connection and the position of the pin determines the extent of movement of the upper segment 118 and consequently the adjustment of the top indicator. This segment 120 is actuated by a lever 130 pivoted at its forward end to the framework of the machine and being connected with said segment 120 by a spiral spring 131 through which extends a rod 132 secured at its lower end to said lever 130 and bearing at its upper end against a pendant ear 133 pivotally connected with the segment 120 and having secured to it one end of the spring 131. The segment 120 is in mesh with a segment 134 on that one of the nested sleeves running to the printer, which sleeve carries the special type. The segment 134 has a series of alining notches adapted to be engaged by a tooth on an arm 135 journaled upon the shaft 116 and spring pressed rearwardly. A cam 136 on a rotation shaft of the machine acts against the arm 135 to press the same into engagement with the alining notches of the segment 134. In this manner the segment 120 is temporarily locked so as to enable its pin to definitely determine the position of the top indicator. The downward movement of the segment 120 is produced by an oscillating cam piece 140 mounted on a rotation shaft of the machine and operating against a roller on the lever 130, and the upward movement of the segment 120 is effected by a spiral spring 141 connecting the lever 130 to a bracket on the frame. When the arm 135 releases the segment 134 this spring 141 can act to restore the parts to normal position.

In operation the arm 124 is drawn back as soon as the crank handle of the machine is started, and this of course unlocks the segment 118 which is drawn back by its spring 126 lifting the link 119 as far as permitted by the slot and pin connection between said link and the segment 120. Meantime the latter is depressed by the cam 140 operating through the medium of the lever 130 and the spring 132 and this depression of the segment 120 continues until one or another of the noses 123 on the lever 122 (Fig. 9) encounters the stem of the inwardly thrust key 2ᵇ. This downward swing of the segment 120 positions the top indicator anew (spring 131 being superior to spring 126) and it is locked in position by the arm 124 which is forced forward by the cam 118 (Fig. 5). The type sleeve segment 134 is also locked in its set position by the arm 135 acted upon by the cam 136, but after the printing has been done, the said cam passes this arm and the latter's spring retracts it so that the spring 141 can then restore the segment 120 to normal position.

In the diagram (Fig. 13), wiring for two rooms having distant indicators is depicted, only the lead wires 88 for the other two rooms being shown. It is thought that this diagram will be fully understood from the description already given as reference numerals are used corresponding with those employed to designate corresponding elements in the other figures and wording is given to denote switches, magnets and solenoids. It may be stated however, that by reference to this diagrammatic Fig. 13 it will be seen that after an amount has been indicated at a certain one of the rooms by the establishment of an electric circuit through this room amount indicator, the circuit may be broken through this room amount indicator by the closing of the drawer which opens the drawer switch and thus breaks the circuit, so that as hereinbefore stated the current no longer runs to this room amount indicator, the amount indicator being normally inert and remaining in its set position until a subsequent actuation of the indicator in which case the indicating disk is moved to a new position; but since the special transaction indicator is an illuminated one requiring the continued establishment of the circuit therethrough, provision is made for the maintenance of this special transaction circuit in the particular room in which the amount indication is displayed even though the circuit through the amount indicator is broken by the drawer switch being open. This result is accomplished by attaching the special transaction lead wire 108 to the battery pole or at some point intermediate the battery pole and the drawer switch, and the other special transaction lead wire 109 to the room switch which is itself directly connected with the battery, so that so long as the variable room contact device or multipolar switch 7ᵃ is retained in its previously adjusted position in the cash register itself, it is apparent that the circuit from the battery will still be maintained through this room switch and the special transaction illluminated indicator for this room, this special transaction indicator circuit being in effect a divisional circuit inside of the main amount indicator circuit for the same room, and by this means the special transaction indicator will remain illuminated until the succeeding operation of the machine when the multipolar switch is rotated to a different room, or the special transaction variable contact device 7ᵈ is rotated to show a different special transaction.

The term "translating device" used in some of the claims is used in a broad and general sense and it is intended that it should cover any form of mechanism or device that indicates or is affected by the passing of an electrical current.

While the form of mechanism here shown and described is admirably adapted to fulfil the objects primarily stated, it is to be understood that it is not desired to confine the invention to the one form of embodiment here disclosed, for it is susceptible of embodiment in various forms all coming within the scope of the claims which follow.

Having thus described my invention, what I claim as new and desire to secure by Letters Patent is:

1. The combination with a cash register having a differentially movable element and manipulative means controlling the movements of said element; of a distant and structurally separate indicator, means for making it effective at a predetermined stage of the operation of the cash register subsequent to adjustment of the differential element of the latter, the character of the indication being determined by such adjustment, and means for retaining said indicator in adjusted indicating position until a succeeding operation of said cash register.

2. The combination with a cash register having a differentially movable element and manipulative means controlling the movements of said element; of a distant and structurally separate indicator, means for setting it in motion at a predetermined stage of the operation of the cash register, means for determining the extent of its movement by the adjustment of the aforesaid differentially movable element in a preceding stage of the operation of the cash register, and means for retaining said indicator in adjusted indicating position until a succeeding operation of said cash register.

3. The combination with a cash register having a differentially movable element and manipulative means controlling the movements of said element; of an electrical indicator, means for establishing a circuit at a predetermined stage in the operation of the cash register subsequent to adjustment of the latter's differential element, the character of the indication being determined by such adjustment, and means for retaining said indicator in adjusted indicating position until a succeeding operation of said cash register.

4. The combination with a cash register having a differentially movable element and manipulative means controlling the movements of said element; of an electrical indicator, means for setting it in motion at a predetermined stage in the operation of the cash register, circuit controlling means regulating the character of the indication by determining the extent of movement of the indicator such means being selected as an accompaniment to the adjustment of the differential element of the cash register previous to the aforesaid stage in the operation of the latter, and means for retaining said indicator in adjusted indicating position until a succeeding operation of said cash register.

5. The combination with a cash register having a differentially movable element and manipulative means controlling the movements of said element; of an electrical indicator, different circuit connection for varying the character of the indication, a variable contact common to said connections and controlled by the differential element of the cash register, means for rendering the indicator effective at a predetermined stage in the operation of the cash register subsequent to adjustment of its differential element, and means for retaining said indicator in adjusted indicating position until a succeeding operation of said cash register.

6. The combination with a cash register having a differentially movable element and manipulative means controlling the movements of said element; of an electrical indicator, means for setting it in motion at a predetermined stage in the operation of the cash register, different circuit connections for varying the extent of movement of the indicator, a variable contact common to said connections and controlled by the differential element of the cash register to select the particular circuit connection at a stage of operation of the cash register previous to that first mentioned, and means for retaining said indicator in adjusted indicating position until a succeeding operation of said cash register.

7. The combination with a cash register having a differentially movable element and manipulative means controlling the movements of said element; of an electrical indicator, means for setting it in motion at a predetermined stage in the operation of the cash register, and circuit controlling means regulating the character of the indication by determining the extent of movement of the indicator such means being selected as an accompaniment to the adjustment of the differential element of the cash register previous to the aforesaid stage in the operation of the latter; together with an automatic switch or cut-out for breaking the circuit at the conclusion of an operation of the cash register.

8. The combination with a cash register having a differentially movable element and manipulative means controlling the movements of said element; of an electrical indicator, means for setting it in motion at a predetermined stage in the operation of the cash register, and circuit controlling means regulating the character of the indication by determining the extent of movement of the indicator such means being selected as an accompaniment to the adjustment of the differential element of the cash register previous to the aforesaid stage in the operation of the latter; together with an automatic switch or cut-out for breaking the circuit at the conclusion of an operation of the cash register, and means for locking the indicator upon such breaking of the circuit.

9. In a cash register, the combination with accounting devices, of means for giving a differential adjustment to same, distant indicating devices, means for differentially adjusting said devices, electrical connections between said accounting devices and said distant indicating devices for controlling the extent of adjustment of said indicating devices in accordance with the adjustment of said accounting devices, and devices permitting said adjustment of the indicating devices only after the accounting device has been completely adjusted.

10. In an indicating machine, the combination with a plurality of indicating stations; of manipulative means common to all of said indicating stations controlling the indication for any one of the same; electrical circuits for said stations, said circuits being selectively controlled by said manipulative means; and a selective means comprising a multipolar switch with means for adjusting the same to establish an indication at one of said stations to the exclusion of the other stations.

11. In an indicating machine, the combination with a plurality of indicating stations of amount controlling circuits for each station; an amount determining means common to all of said station circuits; and a multipolar switch included in a circuit with said various station amount controlling circuits, with provisions for adjusting said multipolar switch to effect the amount indication at any desired station to the exclusion of the other stations.

12. In a cash register, the combination with a revoluble multipolar switch, of manipulative means for controlling the differential positions thereof; a distant differentially movable member; electrical operating means therefor; and electric circuits connecting said electric operating means and said multipolar switch whereby the extent of movement of the distant differential member may be controlled by said multipolar switch.

13. In a cash register, the combination with an operating mechanism, of a multipolar switch; manipulative means for predetermining the differential extent of movement of said multipolar switch; a distant transaction-entering device; different circuit connections between said multipolar switch and said distant transaction-entering device; and means connected with said operating mechanism for setting said multipolar switch upon the operation of the cash register and thereby selecting the proper circuit for the distant transaction-entering device corresponding to the adjustment of said manipulative means.

14. In an indicating machine, the combination with a plurality of indicating stations, of amount controlling circuits for each station; an amount determining multipolar switch included in circuit with the various station amount controlling circuits; manipulative means for determining the position of said amount controlling multipolar switch; a station controlling multipolar switch with electrical connections for causing the amount indication to become effective at any desired station to the exclusion of the other station; and an operating means for setting both of said switches.

15. In an indicating machine, the combination with a cash register, of a distant indicating device, with electrical connections between said cash register and said indicating device to control the indication at the latter according to the transaction entered upon the cash register; means connected with a movable part of the cash register for making and breaking the circuit through the distant indicating device at certain predetermined points in the operation of the cash register; and an independent make and break device controlled by a second movable part of the cash register for maintaining said distant indicating circuit broken when desired.

16. In an indicating machine, the combination with a cash register, of a distant indicating device, with electrical connections between said cash register and said distant indicating device for controlling the indication at the latter according to the transaction entered upon the former; means connected with the operating mechanism of the cash register for breaking the distant indicating circuit at the first movement thereof and making the same again at the final movement of the operating mechanism; and a switch connected with the cash drawer of the cash register for controlling the making or breaking of said distant indicating circuit according to the position of said drawer.

17. In an indicating machine, the combination with a cash register and its operating mechanism, of a main distant indicator; an auxiliary distant indicator; circuits for both of said indicators including a common source of electric energy for actuating both of said distant indicators; means for breaking the circuit through the main indicator at the end of the operation of the cash register; and means for maintaining the circuit through the auxiliary indicator at the end of such operation independently of the breaking of the other circuit.

18. In an indicating machine, the combination with a cash register and its operating mechanism; of a plurality of indicating stations controlled by the common cash register, each of said stations comprising a main indicator and an auxiliary indicator; circuits for the main and auxiliary indicators for the several stations, including a common source of electrical energy therefor; selective means for predetermining at which indicating station the indication shall become effective; means for breaking the circuit through the main indicator of such predetermined station at the end of the operation of the cash register; and means for maintaining the circuit through the auxiliary indicator of said station independently of the breaking of the circuit through the main indicator.

19. In a machine of the class described, the combination with indicators for displaying the amounts and classes of transactions, of means, including a common source of electric energy, for controlling the actuation of said indicators, and means for rendering the controlling means inoperative as to some of the indicators while maintaining the rest of the indicators under the control of said means.

20. In a machine of the class described, the combination with indicators for displaying the amounts and classes of transactions, of means, including a common source of electric energy, for controlling the actuation of said indicators, and means for rendering the controlling means inoperative as to the amount indicators while maintaining the transaction indicator under the control of said means.

21. In a machine of the class described, the combination with a cash register having a money receptacle, of indicators structurally separate from the cash register, for displaying the amounts and classes of transactions entered in the cash register, means, including a common source of electric energy, for controlling the actuation of said indicators, and means actuated by the money receptacle for rendering the controlling means inoperative as to some of the indicators while maintaining the rest of the indicators under the control of said means.

22. In a machine of the class described, the combination with a cash register having a money receptacle, of indicators structurally separate from the cash register, for displaying the amounts and classes of transactions entered in the cash register, means, including a common source of electric energy, rendered operative by the cash register, for differentially positioning the amount indicators and for illuminating the transaction indicator, and means actuated by the money receptacle for disabling the operative relation between the source of electric energy while maintaining the operative relation between said source of electric energy and the transaction indicator.

23. In a cash register, the combination with a multipolar switch and means for setting the same differentially, of a distant transaction-entering device controlled by said switch; means for restoring said multipolar switch to normal position at each operation of the machine; and electrical connections between said switch and said distant device, said switch having selective contact making provisions for each of its differential positions and also having such a contact making provision for the normal position thereof whereby the restoration of said switch to normal position will prepare for the establishment of the corresponding normal position in the distant device.

24. In a cash register, the combination with an accounting device arranged to be given a plurality of positions, manipulative means for giving said device its different positions, an indicating device, electric circuits selectively made and broken by said accounting device, and electrically actuated means for thereafter adjusting said indicating device to an extent dependent on the circuit preliminarily made by the accounting device.

25. In a cash register, the combination with a main operating mechanism, of accounting devices controlled thereby, circuits selectively made by said devices when set, an indicating mechanism, and means for adjusting said indicating mechanism to an extent determined by the circuit selected by the accounting devices.

26. In a cash register, the combination with an operative mechanism, of a differentially movable primary indicator set thereby, a plurality of circuits selectively controlled by said indicator, a secondary indicator and means for operating same to an extent determined by the primary indicator when set.

27. In a cash register, the combination with an operating mechanism, of an accounting device arranged to be operated thereby, a rotating contact maker having a differential motion determined by said accounting device, a plurality of circuits arranged to be selectively completed by said contact maker, and an indicating mechanism adapted to be operated subsequent to the movement of the accounting device to an extent determined by the circuit previously completed.

28. In a cash register, the combination with a primary accounting device and an operating mechanism for same, of a rotating contact maker adapted to be differentially set by said accounting device, a plurality of circuits adapted to be selectively completed by said contact maker, a secondary accounting device and means for operating same to an extent dependent on the circuit previously completed.

29. In an indicating device, the combination with a rotating indicator, of a solenoid including a core, for operating same, and means carried by the core for locking the indicator between operations of the machine.

30. In an indicating machine, the combination with a rotating indicator, of an electrically operated actuator for same, and a projection on said actuator for locking said indicator in any set position.

31. In a cash register, the combination with a primary indicating mechanism, of a secondary indicating mechanism including rotary indicators and electric lights, means for controlling the electric light indicators from one element of the primary indicating mechanism, and means for controlling the rotary indicators from the remaining elements of the primary indicating mechanism.

32. In a cash register, the combination with an operating mechanism, of a cash receptacle having a movable part, an electrical circuit, a translating device in said circuit, and means controlled by the operating mechanism and the movable part of the receptacle for establishing said circuit to operate said translating device.

33. In a cash register, the combination with an operating mechanism, of a cash receptacle having a movable part, an electrical circuit, a translating device in said circuit and means requiring a conjoint operation of the operating mechanism and the movable part of the receptacle for establishing said circuit to operate said translating device.

34. In a cash register, the combination with an operating mechanism, of a cash receptacle having a movable part, an accounting device, an electrical circuit for the latter, and means requiring a conjoint operation of the operating mechanism and the movable part of the receptacle for establishing said circuit to operate said accounting device.

35. In a cash register, the combination with an operating mechanism, of a cash receptacle having a movable part, an electrical circuit, a translating device in said circuit, and a plurality of switches controlled by the operating mechanism and the movable part of the receptacle for establishing said circuit to operate said translating device.

36. In a cash register, the combination with an operating mechanism, of a cash receptacle having a movable part, an accounting device, an electrical circuit for the latter, and a plurality of switches controlled by the operating mechanism and the movable part of the receptacle for establishing said circuit to operate said accounting device.

37. In a cash register, the combination with an operating mechanism, of a cash receptacle having a movable part, an indicating device, an electrical circuit for the latter, means controlled by the operating mechanism and the movable part of the receptacle for establishing said circuit to operate the indicating device, and means also controlled by the cash drawer for holding the indicating device in its operated position.

38. In a cash register, the combination with an operating mechanism, of a cash receptacle having a movable part, an indicating device, an electrical circuit including a plurality of switches for said indicating device, means controlled by the operating mechanism and the movable part of the receptacle for making and breaking the circuit by operating the switches, and an alining device for the indicator brought into operation upon the breaking of the circuit by the movable part of the cash receptacle.

39. The combination with movable parts of a registering machine, of a plurality of indicators for displaying the amounts and classes of transactions, electric circuits controlling said indicators, a common source of electrical energy for said circuits, and separate means for making and breaking said circuits, controlled by said movable parts and constructed to maintain one of said circuits between operations of said movable parts, and to break the other circuits as an accompaniment to the conclusion of operation of the said parts.

40. In an indicating machine, the combination with a plurality of indicating stations, each station comprising a plurality of indicators and solenoids for actuating said indicators, of a single set of differentially movable elements, manipulative devices controlling the movements of said elements, multipolar switches connected to the differentially movable elements and common to all the stations, circuits for the solenoids of each station controlled by the multipolar switches, and an additional multipolar switch and electrical connections for determining the station in which the indicators are to be operated to the exclusion of the other stations.

41. In an indicating machine, the combination with a plurality of indicating stations, each station comprising solenoids for actuating the indicators therein and a plurality of magnetically controlled stops for the indicators, of a single set of differentially movable elements, manipulative devices controlling the movements of said elements, multipolar switches connected to the differentially movable elements and common to all of the stations, circuits for the solenoids and magnets controlling the indicator stops of each station, controlled by the multipolar switches, and an additional multipolar switch and electrical connections for determining the station in which the indicators are to be operated to the exclusion of the other stations.

In testimony whereof I affix my signature in the presence of two witnesses.

WILLIAM F. SCHWEIGER.

Witnesses:
J. B. HAYWARD,
WM. O. HENDERSON.

---

Copies of this patent may be obtained for five cents each, by addressing the "Commissioner of Patents, Washington, D. C."